April 30, 1935.  S. M. WECKSTEIN  1,999,710
CAR WHEEL BEARING AND CLOSURE
Filed Aug. 23, 1933
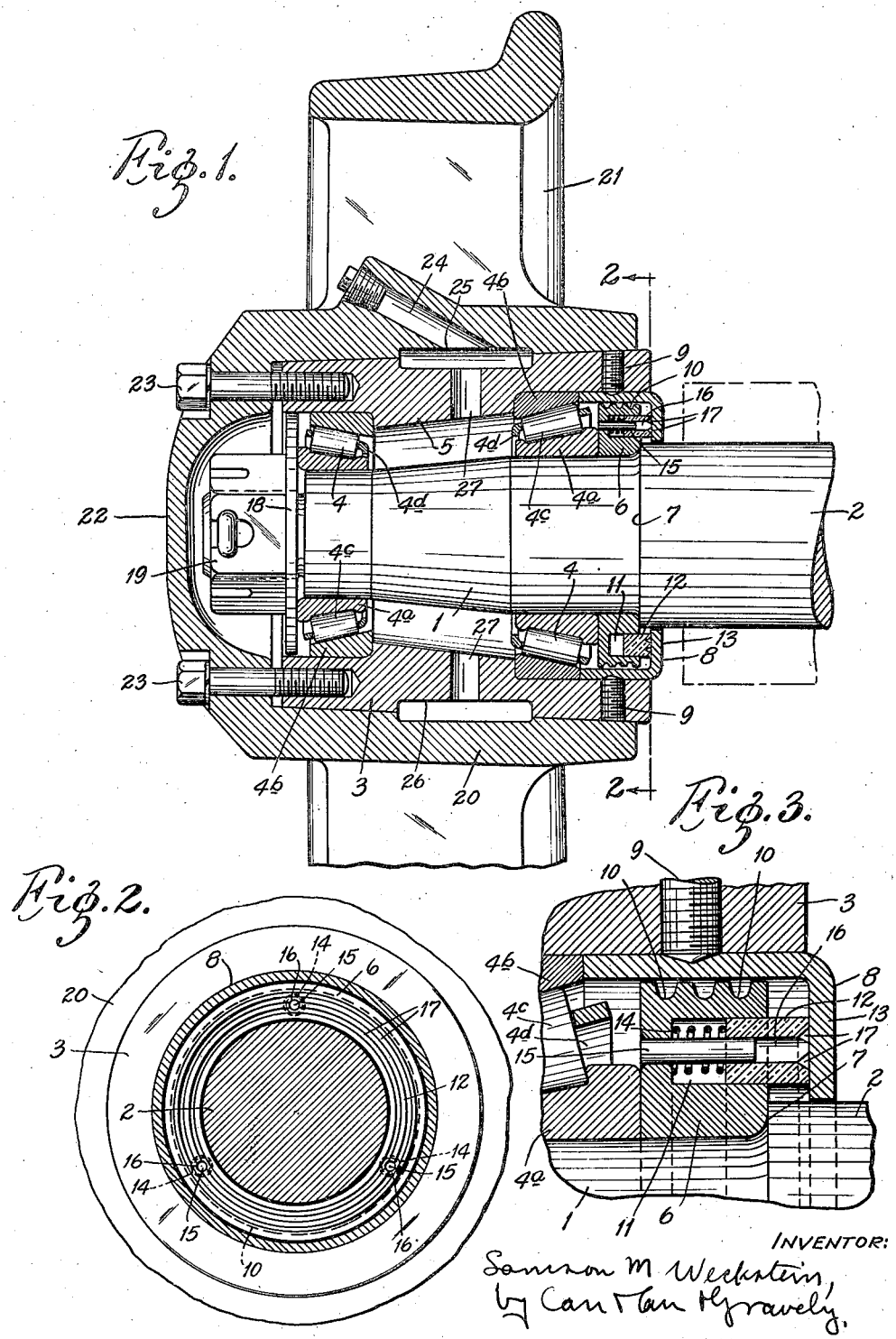

Patented Apr. 30, 1935

1,999,710

UNITED STATES PATENT OFFICE 1,999,710

CAR WHEEL BEARING AND CLOSURE

Samson M. Weckstein, Canton, Ohio, assignor to The Timken Roller Bearing Company, Canton, Ohio, a corporation of Ohio Application August 23, 1933, Serial No. 686,326

11 Claims. (Cl. 308—187)

My invention relates to the bearings and closures of car wheels, particularly mine car wheels. It has for its principal object a simple and efficient closure arrangement for preventing escape of lubricant from the bearing enclosure and preventing ingress of dirt, water and other foreign matter into the bearing enclosure. Another principal object is a car wheel that is easily mountable on and removable from the bearing housing. Other objects and advantages will appear hereinafter.

The invention consists principally in the car wheel bearing and closure, and in the parts and combinations and arrangements of parts hereinafter described and claimed.

In the accompanying drawing, wherein like reference numerals refer to like parts wherever they occur, Fig. 1 is a longitudinal sectional view of a mine car wheel bearing construction embodying my invention;

Fig. 2 is a cross-sectional view on the line 2—2 in Fig. 1; and

Fig. 3 is an enlarged fragmentary section similar to Fig. 1.

The reduced end portion 1 of a mine car or other railway car axle 2 extends into a housing 3 and an antifriction bearing 4 is interposed between said housing and said axle. The bearing illustrated in the drawing comprises two taper roller bearings 4 arranged with the smaller ends of the rollers inwardly, each bearing consisting of a cone or inner bearing member 4a mounted on the axle, a cup or outer bearing member 4b mounted against a rib 5 in the bore of the bearing housing, conical bearing rollers 4c interposed between said cup and cone and a cage 4d for said rollers.

The innermost bearing cone 4a abuts against a collar 6 that is mounted against a shoulder 7 on the axle and that fits closely in a sleeve 8 that is mounted in the end of the bore of the bearing housing 3. Said sleeve 8 is preferably held against rotation by means of headless set screws 9 mounted in the bearing housing 3 and engaging said sleeve 8. The outer periphery of the collar 6 is provided with annular grooves 10 after the fashion of dust collars now commonly used.

In the face of the collar 6 at the innermost end of the bearing enclosure is an annular recess 11 in which is mounted a ring 12 that bears against the inside face of an inwardly extending radial flange 13 provided on said sleeve 8. Springs 14 are interposed between said ring 12 and the bottom of said recess 11 to press the ring against said flange. Pins 15 secured to said collar 6 and projecting into said recess 11 and into holes 16 provided therefor in said bearing ring 12 serve to position said springs 14 and said bearing ring 12. Preferably, said bearing ring 12 is provided with annular grooves 17 in its bearing face. Said bearing ring 12 is made of bakelite or other material suitable for withstanding frictional engagement with the flange 13 of the sleeve 8 in the housing.

At the outer end of the axle is a washer 18 bearing against the outermost cone 4a and fitting closely in the end of the bearing housing 3, and a positioning and securing nut 19 for said washer 18 and bearings 4 is mounted on the end of the axle 2.

The outer surface of the bearing housing 3 tapers toward the outer end of the axle and on it is mounted the correspondingly tapered hub portion 20 of a railway car wheel 21. Said hub 20 has an integral cover portion 22 at its outer end and securing bolts 23 extend through said cover into the bearing housing 3 for securing the wheel 21 on said housing 3.

The wheel may be provided with an angular bore 24 for lubricant terminating in an annular shallow recess 25 around the inner periphery of the hub 20 and the bearing housing may have a mating annular recess 26 around its outer periphery and radial passageways 27 communicating with said annular recess 26 and with the interior of the bearing housing 3.

The bearing closure arrangement above described is quite simple and it very effectively seals the bearing under the most severe service conditions. The bearing and housing arrangement permit removal of the wheel without disturbing the bearing adjustment and the wheel securing bolts are mounted at the outside where they are easily accessible. Obviously numerous changes may be made without departing from the invention and I do not wish to be limited to the precise construction shown.

What I claim is:

1. A bearing housing, an axle extending thereinto, an antifriction bearing between said axle and housing including an inner bearing member, a collar on said axle in the end portion of said housing against which said inner bearing member abuts, said collar having an annular recess in its end face, a bearing ring in said annular recess and an inwardly extending flange member at the end of said bearing housing whose inside face is engaged by said bearing ring.

2. A bearing housing, an axle extending thereinto, an antifriction bearing between said axle and housing including an inner bearing member, a collar on said axle in the end portion of said housing against which said inner bearing member abuts, said collar having an annular recess in its end face, a bearing ring in said annular recess, an inwardly extending flange member at the end of said bearing housing whose inside face is engaged by said bearing ring, and resilient means pressing said bearing ring against said flange.

3. In combination, an axle having a reduced and shouldered portion, a collar on said reduced axle portion mounted against said shoulder, an antifriction bearing having an inner bearing member mounted on said axle against said collar, a bearing housing extending over said collar, a sleeve in said housing closely fitting the outer periphery of said collar, said sleeve having an inwardly extending annular flange on the opposite side of said collar from said bearing closely fitting said axle, said collar having an annular recess in its end face, a bearing ring in said recess and resilient means between said bearing ring and the bottom of said recess holding said bearing ring in engagement with said flange.

4. In combination, an axle having a reduced and shouldered portion, a collar on said reduced axle portion mounted against said shoulder, an antifriction bearing having an inner bearing member mounted on said axle against said collar, a bearing housing extending over said collar, a sleeve in said housing closely fitting the outer periphery of said collar, said sleeve having an inwardly extending annular flange closely fitting said axle, said collar having an annular recess in its end face, a bearing ring in said recess, said ring having a plurality of openings therethrough, pins secured to said collar and extending into said openings and springs on said pins holding said bearing ring in engagement with said flange.

5. In combination, an axle having a reduced and shouldered portion, a collar on said reduced axle portion mounted against said shoulder, an antifriction bearing having an inner bearing member mounted on said axle against said collar, a bearing housing extending over said collar, a sleeve in said housing closely fitting the outer periphery of said collar, said sleeve having an inwardly extending annular flange closely fitting said axle, said collar having an annular recess in its end face, a bearing ring in said recess, resilient means between said bearing ring and the bottom of said recess holding said bearing ring in engagement with said flange, said housing tapering towards the outer end, a wheel having a conical hub fitting over said housing, said hub having an integral end cover and securing bolts extending through said cover into said housing.

6. Closure means for the annular space between a hollow body and a shaft or axle of smaller diameter extending into said hollow body, comprising a collar on said axle whose outer periphery fits closely in said hollow body to form a seal, said collar having an annular recess in its outwardly disposed face, a bearing ring in said annular recess and a flange member extending radially inward from said housing and overlapping said collar, said bearing ring engaging the inside face of said flange.

7. Closure means for the annular space between a hollow body and a shaft or axle of smaller diameter extending into said hollow body, comprising a collar on said axle whose outer periphery fits closely in said hollow body to form a seal, said collar having an annular recess in its outwardly disposed face, a bearing ring in said annular recess, a flange member extending radially inward from said housing and overlapping said collar, said bearing ring engaging the inside face of said flange, and resilient means pressing said ring against said flange.

8. Closure means for the annular space between a hollow body and a shaft or axle of smaller diameter extending into said hollow body, comprising a collar on said axle whose outer periphery fits closely in said hollow body to form a seal, said collar having an annular recess in its outwardly disposed face, a non-metallic bearing ring in said annular recess, a flange member extending radially inward from said housing and overlapping said collar, said bearing ring engaging the inside face of said flange, and resilient means pressing said ring against said flange.

9. Closure means for the annular space between a hollow body and a shaft or axle of smaller diameter extending into said hollow body, comprising a sleeve in said body, a collar on said axle whose outer periphery fits closely in said sleeve to form a seal, said collar having an annular recess in its outwardly disposed face, a bearing ring in said annular recess, a flange member extending radially inward from said sleeve overlapping said collar and closely fitting said axle, and resilient means between said bearing ring and the bottom of said recess, causing said bearing ring to engage the inside face of said flange.

10. Closure means for the annular space between a hollow body and a shaft or axle of smaller diameter extending into said hollow body, comprising a sleeve in said body, a collar on said axle whose outer periphery fits closely in said sleeve to form a seal, said collar having an annular recess in its outwardly disposed face, a non-metallic bearing ring in said annular recess, a flange member extending radially inward from said sleeve overlapping said collar and closely fitting said axle, and resilient means between said bearing ring and the bottom of said recess, causing said bearing ring to engage the inside face of said flange.

11. In combination, an axle having a reduced and shouldered portion, a collar on said reduced axle portion mounted against said shoulder, a bearing housing extending over said collar, a sleeve in said housing closely fitting the outer periphery of said collar, said sleeve having an inwardly extending annular flange closely fitting said axle, said collar having an annular recess in its end face, a bearing ring in said recess, said ring having a plurality of openings therethrough, pins secured to said collar and extending into said openings and springs on said pins holding said bearing ring in engagement with said flange.

SAMSON M. WECKSTEIN.